United States Patent

[11] 3,599,022

[72] Inventor John D. Adair
 Huntington Valley, Pa.
[21] Appl. No. 52,876
[22] Filed July 7, 1970
[45] Patented Aug. 10, 1971
[73] Assignee The Singer Company
 New York, N.Y.

[54] IMPULSE GENERATOR FOR METERS
 8 Claims, 16 Drawing Figs.
[52] U.S. Cl. .................................................. 310/75 A,
 74/125.5, 310/78, 310/83, 310/168
[51] Int. Cl. .................................................. H02k 7/10
[50] Field of Search .......................................... 310/168,
 171, 75, 75 A, 75 D, 78, 80, 83, 68 D, 92, 99, 100;
 74/125.5

[56] References Cited
UNITED STATES PATENTS
2,105,719 1/1938 Collins ............................ 310/75 A
2,261,073 10/1941 Painter ........................... 310/75 A
3,004,179 10/1961 Chartier et al. ................. 310/83
3,125,890 3/1964 Dillon et al. .................... 74/125.5
3,214,715 10/1965 Lace ............................... 310/168 X
3,422,700 1/1969 Wittwer .......................... 310/75 R Primary Examiner—Milton O. Hirshfield
Assistant Examiner—Mark O. Budd
Attorneys—Marshall J. Breen, Chester A. Williams, Jr. and Harold Weinstein ABSTRACT: An impulse generator powered by a meter to generate an AC voltage which is rectified to a DC pulse. Each DC pulse corresponds to a predetermined quantity of fluid medium flowing through the meter. The DC pulse is transmitted to a remote counter located for easy access to permit convenient reading of the register thereof. The impulse generator is compact so as to fit within the housing of a conventional meter or a modified housing of a previously installed meter.

PATENTED AUG 10 1971
3,599,022
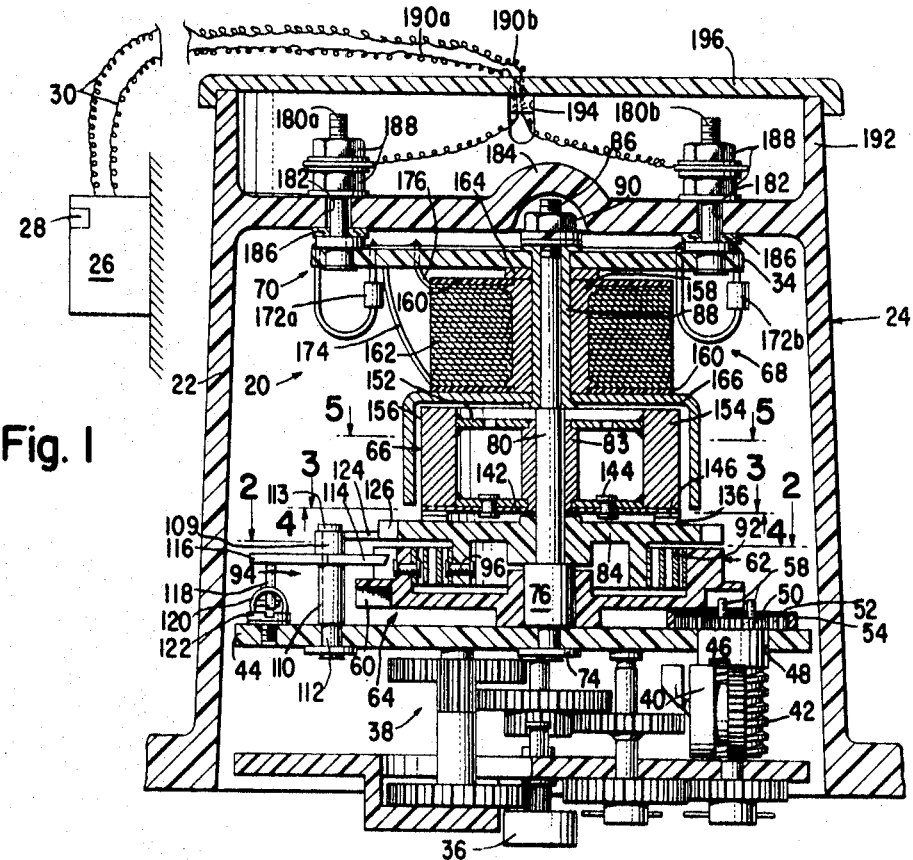
Fig. 1
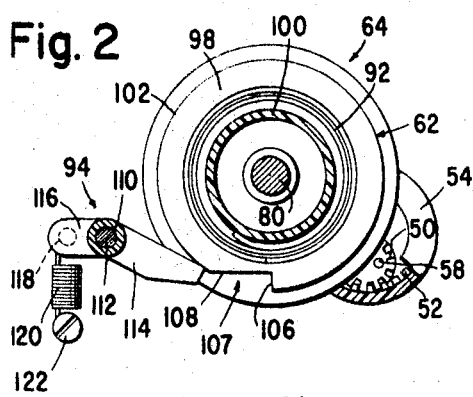
Fig. 2
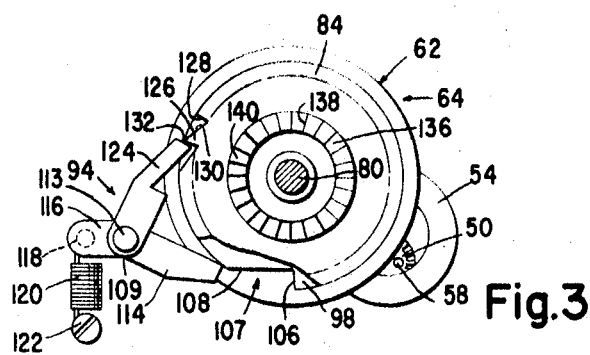
Fig. 3
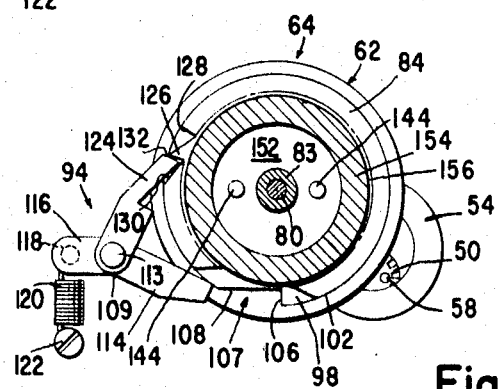
Fig. 5
Fig. 4
INVENTOR.
John D. Adair
BY: Harold Weinstein
ATTORNEY
WITNESS:
Patrick McDonnell

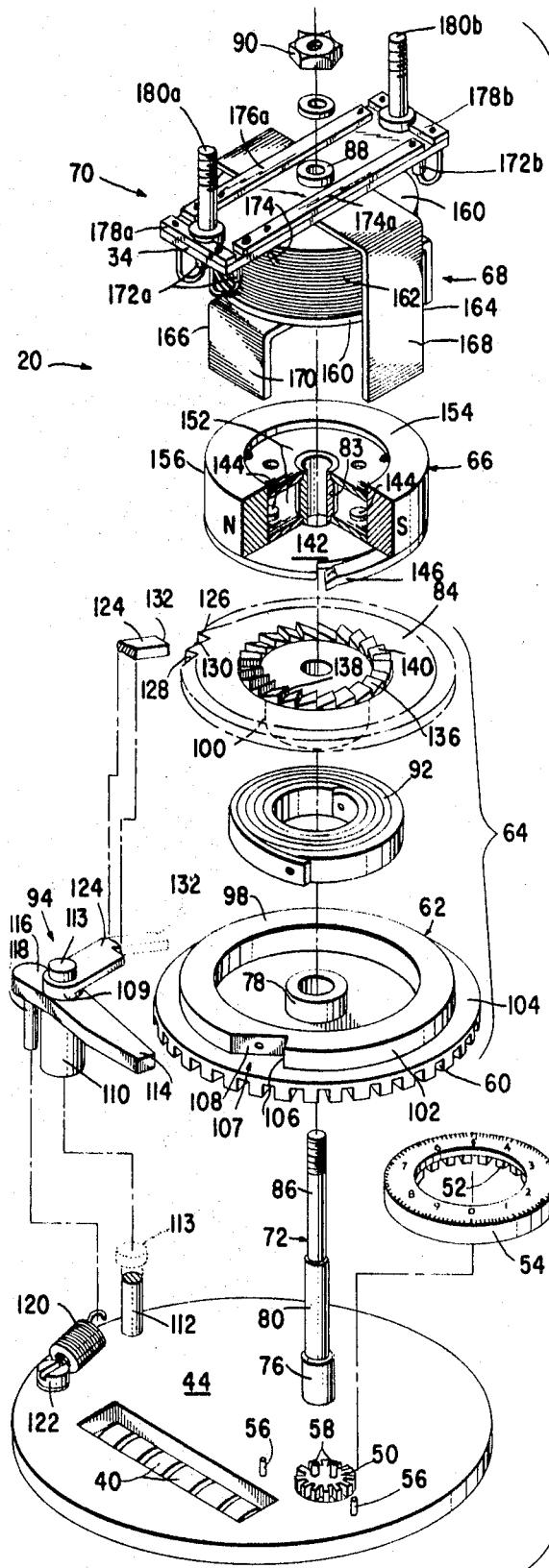
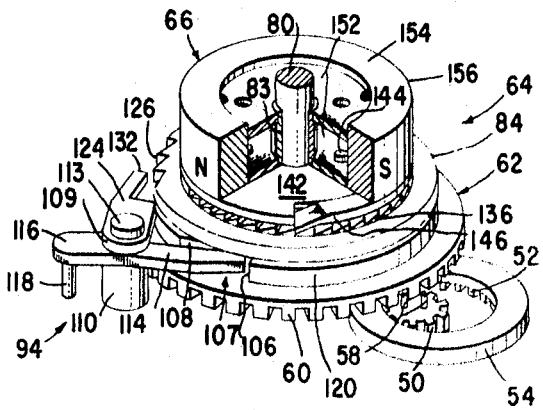
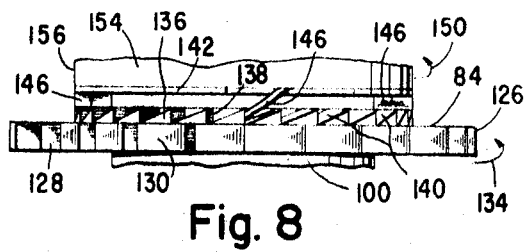
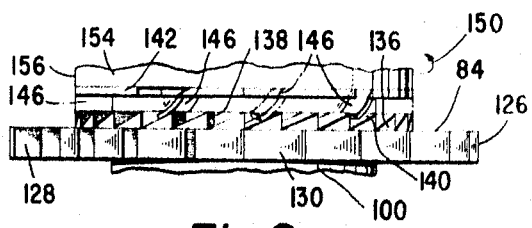

3,599,022

IMPULSE GENERATOR FOR METERS

BACKGROUND OF THE INVENTION

Heretofore, impulse generators for meters produced a single DC pulse by moving the magnet with respect to the coil assembly by means of a stepping mechanism or a reciprocating mechanism. In either case, the impulse generators were required to be overly complex and large so as to produce a DC pulse sufficiently large to operate a remotely located counter. Since the impulse generator was driven from the meter, this placed an added burden on the mechanical parts of the meter so as to effect cost and long term reliability.

SUMMARY OF THE INVENTION

It is therefore an object of the present invention to provide an improved impulse generator for meters which overcome the prior art disadvantages; which is simple, economical and reliable; which produces an AC voltage subsequently rectified to a DC pulse; which is compact so as to fit within the housing of a new meter or modified housing of a previously installed meter; which includes a drive assembly having a drive means and a driven means connected to be intermittently driven thereby; which includes a drive assembly having a one-way clutch connected to the magnet to permit the same to continue rotation after the drive assembly has stopped; which has a drive assembly that includes a cam actuated lock and release means that triggers the selected release of the driven means; and which includes a unidirectionally rotated drive assembly and magnet assembly which rotates relatively to the coil assembly to generate an AC voltage.

Other objects and advantages will be apparent from the following description of one embodiment of the invention and the novel features will be particularly pointed out hereinafter in the claims.

BRIEF DESCRIPTION OF THE DRAWINGS

This invention is illustrated in the accompanying drawings in which:

FIG. 1 is a partial sectional view of a meter embodying the impulse generator of the present invention;

FIG. 2 is a view taken along line 2—2 of FIG. 1;

FIG. 3 is a view taken along line 3—3 of FIG. 1;

FIG. 4 is a bottom view taken along line 4—4 of FIG. 1;

FIG. 5 is a view taken along line 5—5 of FIG. 1;

FIG. 6 is an exploded perspective view of the impulse generator of the present invention;

FIG. 7 is a perspective view of the drive assembly and magnet assembly of the present invention;

FIG. 8 is a diagrammatic elevational view of the driven wheel driving the magnet assembly through the one-way clutch;

FIG. 9 is a diagrammatic elevational view of the magnet assembly continuing to rotate as the clutch slips with respect to the now stationary driven wheel;

FIG. 15 is an elevational view of the drive assembly and the annular magnet subsequent to the release and rotation of the driven wheel which rotates the magnet;

FIG. 16 is a top plan view taken along line 16—16 of FIG. 15.

DESCRIPTION OF THE INVENTION

Figure 10:
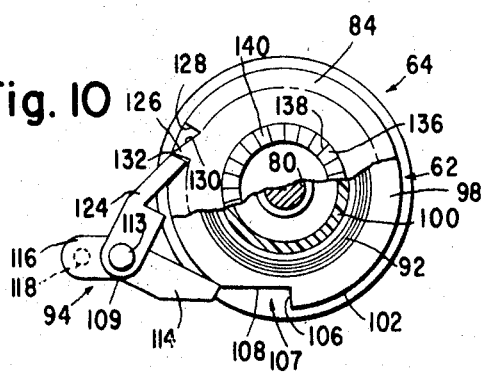
FIG. 10 is a top plan view of the drive assembly at the start of a typical revolution with the spring thereof unwound and the driven wheel held stationary.

In the embodiment of the invention illustrated in FIG. 1, the novel impulse generator, designated generally as 20 is operatively connected within a housing 22 of a conventional meter 24 through which the fluid to be measured passes through a lower portion (not shown). The meter 24 for convenience is designated as a water meter, although it is understood that the present invention is contemplated for embodiment into a meter which measures any fluid. The meters usually located inside the building at a site which is inaccessible from the outside. On the outside of the building in a location convenient to a meter reader, is a remote counter 26 which includes a register 28. The remote counter 26 is connected to the meter 24 by conductors 30 leading from the circuit board 34 of the impulse generator 20.

The fluid medium passing through the meter 24 will rotate a measuring mechanism (not shown) that will cause magnet 36 to rotate. The magnet 36 drives a gear train 38 which, in turn, drives a register 40 through a worm drive 42 in a conventional manner. A top plate 44 is mounted in the housing 22 above the gear train 38 and has an aperture 48 formed on one side thereof. A cylindrical portion 46 of the worm drive 42 extends through the aperture 48, and the uppermost end thereof has a plurality of circumferentially spaced teeth 50 formed therein to mate with teeth 52 formed in the inner circumference of an annular proving wheel 54 held in rotatable position by a pair of spaced guide posts 56, shown in FIG. 6.

A gear 58 having two diametrically opposed pins is formed upon the top surface of the worm drive 42 to extend through the open center of and axially upwardly of the upper surface of the proving wheel 54 to engage circumferentially spaced teeth 60 formed on the underside of a drive wheel 62 of the drive assembly, designated generally as 64. In a preferred form, the gear 58 will rotate once for every 5 gallons of water flowing through the meter 24. Assuming the drive wheel 62 has 40 teeth 60, the reduction ratio will be 20:1, or one complete rotation of the drive wheel 62 occurs every 100 gallons. The impulse generator 20, as explained more fully hereinafter, will operate to transmit a DC pulse for each revolution of the drive wheel 62, or for every 100 gallons. Thus, the impulse generator 20 will actuate the register 28 of the counter 26 by transmitting the DC pulse thereto, and therefore the readings of the remote register 28 will be the same as the reading of the meter register 40, though it will be the same as the reading of the meter register 40, through it will be more convenient to read the remote register 28.

The impulse generator 20 includes the drive assembly 64, a magnetic assembly 66, a coil assembly 68 and a diode rectifier assembly 66, a coil assembly 68 and a diode rectifier assembly 70 with eafh of said assemblies being carried on a stationary shaft 72, fixedly connected to the plate top 44 by a washer 74 staked in place upon a small diameter portion of the shaft 72 which extends through the plate top 44. Above the plate top 44 the shaft 72 has its largest diameter section 76 upon which is journaled the hub 78 of the drive wheel 62. Intermediate diameter section 80 has journaled thereon the hub 82 of a driven wheel 84 of the drive assembly 64, and spaced thereabove is a hub 83 of the magnetic assembly 66. The smallest diameter section 86 carries a stationary coil hub 88 with the assembly being held in place by a nut 90 threaded to the upper end of the shaft 72. The upper surface of the respectively larger diameter sections 76 and 80 serve as vertical seats for the hub 82 and 88 respectively so as to insure the relative position of each upon the shaft 72. Only the coil hub 88 is nonrotatably mounted to the shaft 72 with the hubs 78, 82 and 83 free to rotate thereon.

The drive assembly 64 also includes a spiral spring 92 and a lock and release assembly 94. The spring 92 is connected at either end by an eyelet 96 so as to interconnect the drive wheel 62 and the driven wheel 84. The spiral spring 92 is nested in an annular opening formed between opposite axially extending annular flanges 98 and 100 of the drive wheel 62 and the driven wheel 84, respectively. Measured from the axis of the shaft 72, the flange 98 is radially outwardly of the flange 100, so that each axially overlaps the other. A cam surface 102 formed on the outer circumference of the flange 98 above the teeth 60 and stepped inwardly of the top enclosure 104 thereof. The cam surface 102 is substantially circular and has a single radial step 106 which extends inwardly for a distance a little greater than the length of a tooth 60 to form one wall of a recess 107, with the other wall thereof formed by an inclined portion 108 which returns to the circular surface of the cam 102.

The lock and release assembly 94 includes a lock and release link 109 which has a hollow body portion 110 journaled to pivot upon a stationary post 112 which is staked upon the top plate 44 on the opposite side thereof from the two-pin gear 58. The stationary post 112 has an enlarged head 113 which holds the lock and release link 109 captive thereon. A pivot arm 114 and a bias arm 116 are formed integrally on the link 109 at the same elevation corresponding to that of the cam surface 102. The biasing arm 116 has a downwardly extending pin 118 to which one end of a coil spring 120 is affixed with the other end held by a screw 122 threaded into the plate top 44 at a point which places the spring 120 in slight tension. The spring 120 is mounted in front of the bias arm 116, as viewed in FIGS. 1, 2 and 6, to urge the arm 114 to pivot in a counterclockwise direction to bias the same against the cam surface 102 whereby the pivot arm 114 will act as a cam follower. A check arm 124 is formed integrally on the link 109 and extends at an angle of substantially 90° with respect to the pivot arm 114 and axially above the arm 114 at a horizontal elevation corresponding to that of the driven wheel 84. The position of the link 109 with respect to the shaft 72 is such that when the pivot arm 114 moves toward the shaft 72, the check arm 124 will move away from the shaft 72, and when the pivot arm is moved away from the shaft 72 the check arm 124 will move in a direction toward the shaft 72.

The outer circumference of the driven wheel 84 has a plurality of saw teeth 126 which are formed by a step 128 extending radially inwardly from the outermost surface and an inclined portion 130 which extends in the opposite direction from the inclined portion 108 of the drive wheel 62. The circumferentially spaced saw teeth 126 are formed on the driven wheel 84 for convenience of assembling the impulse generator 20 so as not to make the point of connection of the driven wheel 84 to the spring 92 critical. Once the connection by the eyelet 96 has been made one saw tooth 126 will be used substantially exclusively.

The spring 120 biases the pivot arm 114 into contact with the cam surface 102, and as shown in Figs. 3 and 10, when the pivot arm 114 engages the circular portion of the cam surface 102 the flat outer edge 132 will abut the step 128 of one of the saw teeth 126 for purposes more fully explained hereinafter.

Figure 13:
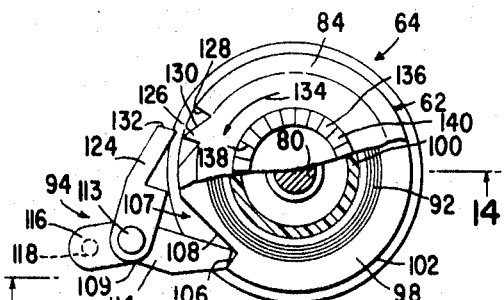
FIG. 13 is a top plan view, partly broken away, showing the driven wheel released to be rotated by the unwinding of the spring.

Upon the drive wheel 62 completing a revolution, the pivot arm 114 will trip into the recess 107 at the step 106 of the cam surface 102 as illustrated in FIG. 13. In this position the check arm 124 is disengaged from the driven wheel 84 which remains in released condition until the pivot arm 114 returns to the circular portion of the cam surface 102 so that the pivoting movement of the link 109 returns the check arm 124 into locking engagement with one of the saw teeth 126 to once again hold the driven wheel 84 in nonrotatable position.

Figure 11:
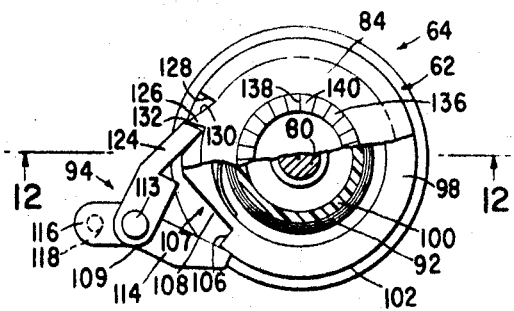
FIG. 11 is a top plan view, partly broken away, of the drive assembly showing the spring substantially in a wound position and the driven wheel held stationary.
Figure 12:
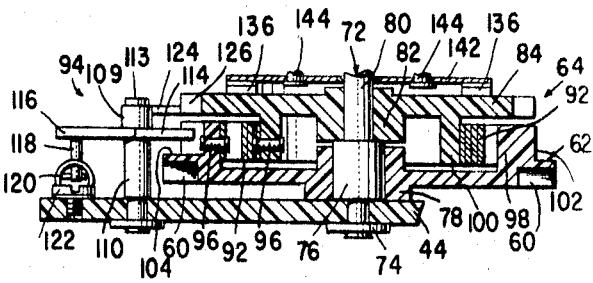
FIG. 12 is a view taken along line 12—12 of FIG. 11.

The drive assembly 64 of the impulse generator 20, illustrated most completely in Figs. 1, 6 and 7 is powered by the meter 24 and stores energy in the spring 92 which is released at the end of each revolution to drive the driven wheel 84. During operation of the meter 24, the magnet 36 will rotate to drive the worm drive 42 through the gear train 38, thus, also rotating the two-pin gear 58, as illustrated in Figs. 1 and 2, which in turn drives the drive wheel 62 by the pins thereof successively engaging alternate teeth 60 thereof. At the start of a revolution, the pivot arm will be disposed within the recess 107 of the cam surface 102, and the check arm 124 will be disengaged from the driven wheel 84 as shown in Figs. 7 and 13. As the drive wheel 62 is rotated by the gear 58, the pivot arm 114 will slide upon the inclined portion 108 to reach the circular portion of the cam surface 102. As the arm 114 pivots clockwise, a like motion occurs in the check arm 124 to bring the edge 132 thereof into abutment with the step 128 of one of the saw teeth 126. The driven wheel 84 unless restrained would have a tendency to rotate with the drive wheel 62 due to the interconnection of the spring 92, but the check arm 124 prevents this, and on engaging the driven wheel 84 holds the same from turning. At the beginning of each revolution of the drive wheel 62, the spring 92 is unwound as illustrated in Figs. 1, 2 and 10. The spring 92 is wound as shown in Figs. 11 and 12 during each revolution of the drive wheel 62 so as to store energy in the spring during the full revolution of the drive wheel 62 when the driven wheel 84 is held nonrotatable The release of the spring 92 is triggered by the pivot arm 114 tripping into the recess 107 as it passes the step 106 of the cam 102. As the pivot arm 114 moves in the check arm 124 suddenly to release the driven wheel 84 which then partakes of a spring-powered revolution in the direction indicated by the solid arrow 134 in Fig. 13.

Annular saw tooth projections 136 as best seen in Figs. 6, 7, 8 and 9, are formed on the driven wheel 84 with vertical faces 138 extending between inclined portions, which as viewed radially inwardly extend upwardly from left to right therebetween. A sprag or one-way clutch 142 may be considered a part of the drive assembly 64, through it is physically connected to the magnet assembly 66 by eyelets 144. The sprag clutch 142 includes an annular plate of thin resilient nonmagnetic material, such as copper, having a plurality of circumferentially spaced sprags or downwardly bent fingers 146 which are bent downwardly in the same direction as the inclined portion 140 of the saw tooth projections 136. The sprags 146 are continuously in engagement with the saw tooth projections 136 and serve to raise the magnet assembly 66 above the surface thereof. Upon the spring 92 being wound and the driven wheel 84 released to rotate, the vertical face 138 will drive against the sprags 146 to rotate the magnet assembly 66 as indicated in Fig. 8 by the arrows 134 and 150 which represent the rotation of the driven wheel 84 and the magnet assembly 66, respectively. The spring 92 is wound during one revolution of the drive wheel 62 and unwound during a single revolution of the driven wheel 84. However, the momentum transmitted to the magnet assembly 66 is not exhausted after a single revolution, and as the magnet assembly 66 continues to rotate the sprags 46 slide over successive inclined portions 140 of the saw tooth projections 136 as indicated diagrammatically in Fig. 9 by the full line and dotted line sprags 146 during turning of the magnet represented by the arrow 150.

The magnetic assembly 66 includes a pair of axially spaced annular disks 152 having the inner circumference thereof seated upon top and bottom shoulders of the hub 83. A permanent magnet 154 annularly shaped has its inner circumference connected to the outer circumference of the spaced disks 152. The various connections between the hub 83, the disks 152 and the magnet 154, as well as the connection of the clutch 142 to the bottom side of the annular magnet 154 and bottom disk 152 may be made by a suitable adhesive cement. The permanent magnet 154 shown in the preferred embodiment has a pair of alternately oppositely magnetized poles formed on the circumferential surface 156 at substantially 90° intervals as illustrated in Figs. 6 and 7 by the north pole "N" and south pole "S" reference characters. The hub 83 of the magnet assembly 66 is journaled on section 80 of the shaft 72 with the sprags 146 axially positioning the magnet assembly 66 thereon.

The coil hub 88 of coil assembly 68 is stationarily mounted to the shaft section 86 and rests on a shoulder atop section 80 so as to provide a small axial space between the respective assemblies. Radially outwardly of the hub 88 and affixed thereto is a coil core 158 to which top and bottom bobbin disks 160 are affixed to permit wire to be wound about the core 158 to form a wire coil 162. An upper and a lower pole piece 164 and 166 respectively are each in physical contact with opposite ends of the coil core 158. The pole pieces 164 and 166 are each substantially U-shaped with the base portion running substantially the diametrical length of the disks 160 and having the outer legs 168 and 170 extend axially downwardly to terminate adjacent the bottom of the magnet 154. The leg 168 originates from the top of the core 158 and therefore it is somewhat longer than the leg 170 which originates from the bottom of said core. The legs 168 and 170 are formed in pairs which enclose the magnet 154 and are positioned alternately at a circumferential spacing of substantially 90° corresponding to each of the pole faces formed on the circumferential surface 156 of the movement 154. Thus, the upper pole piece 164 will have its leg opposite a magnetized pole of the same polarity at either side of the magnet 154, since both are exposed along a line of 180°. Assuming the legs 168 are each opposite a magnetized south pole "S," then the legs 170 will each be opposite a magnetized north pole "N." The magnetic force of attraction will force the magnetized poles into alignment opposite each of the legs 168 and 170 of the respective pole pieces 164 and 166.

Mounted immediately above the upper pole piece 164 is an insulated circuit board 34 which carries the diode rectifier assembly 70 having pairs of diodes 172a and 172b of opposite polarity. Two lead lines or conductors 174 and 176 from the wire coil 162 are connected to conductors 174a and 176a which extend on either side of the circuit board between the oppositely polarized diodes. Each pair of like polarized diodes 172a and 172b are connected to conductors 178a and 178b, respectively, to terminal posts 180a and 180b which pass through apertures 182 formed in the top wall 184 of the housing 22. The apertures 182 are sealed by gaskets 186 disposed about the posts 180a and 180b and fixedly connected therein by a pair of nuts 188 threadedly connected thereto. Conductors 190a and 190b are connected to the respective terminal posts 180a and 180b and combined to form the line 30 which connects into the counter 26. The terminal posts 180a and 180b are housed in the open-ended top section 192 of the housing 22 which has a small slotted opening 194 and one side thereof to permit the conductors 190a and 190b to exit therefrom, and it is enclosed by a cover 196 to prevent dirt or damage to the conductors 190a and 190b and the respective connections to the posts 180a and 180b. The posts 180a and 180b are staked to the circuit board 34 adjacent either end thereof.

Figure 14:
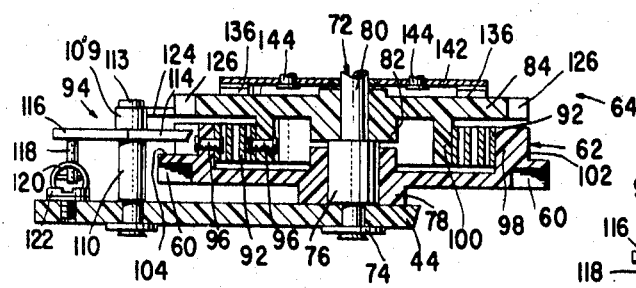
FIG. 14 is a view taken along line 14—14 of FIG. 13.

During operation of the meter 24 the drive assembly 64 is activated as described hereinbefore so as to have the spring 92, shown unwound in FIG. 10, energized and wound as shown in Figs. 11 and 12. Thereafter, upon completion of a single revolution of the drive wheel 62 which in the preferred embodiment of the invention corresponds to 100 gallons of water passing through the meter 24. At the end of each revolution of the drive wheel 62, the lock and release link 109 is activated to release the driven wheel 84 as illustrated in Figs. 13 and 14, and simultaneously the spring 92 is released to drive the driven wheel 84 through one revolution while the spring 92 unwinds. The rotary motion of the driven wheel 84 is transmitted through the sprag clutch 142 to the magnet assembly 66 to rotate the annular magnet 154 for the single revolution of the driven wheel 84 powered by the unwinding of the spring 92 as indicated in Fig. 8 by the motion arrows 134 and 150, and thereafter during the continued rotation of the magnet 154 as indicated by the motion arrow 150 until such time as the momentum thereof is exhausted. Accordingly, the magnet is able to obtain a "free-spin" of an additional revolution, more or less.

Each time one of the magnetized north and south poles spins past one of the pole pieces 164 and 166, an electromotive force is induced in the coil so as to generate an AC voltage in the coil assembly 68 which is transmitted to the diode rectifier 70 to convert the AC voltage to a DC voltage pulse transmitted through the conductors 190a and 190b to the remotely located counter 26. The rate or the individual DC pulses will correspond to one for every 100 gallons of water passing through the meter 24.

By permitting the magnet 154 to rotate through more than one revolution, it is possible to produce several cycles of AC voltage, which when r3ctified and applied to the counter as a single DC pulse, enables the present impulse generator 20 to utilize a much smaller system while obtaining a comparable DC pulse as that of larger prior art systems. This is important in that it provides a mechanical advantage of reducing the wear of the moving parts while not interfering with the normal operation of the conventional meter. And even more important, permits the improved impulse generator 20 to be sized to fit within the housing of a meter of substantially comparable size to that of meters not having this feature. The present impulse generator can also be added to previously installed meters with but minor modifications of said meters.

The components of the impulse generator are substantially light weight and the drive wheel 62, driven wheel 84 and lock and release link 109 of the drive assembly, may be made of plastic or other suitable light weight material.

It will be understood that various changes in the details, materials, arrangements of parts and operating conditions which have been herein described and illustrated in order to explain the nature of the invention may be made by those skilled in the art within principles and scope of the invention.

Having thus set forth the nature of the invention what I claim herein is:

1. An impulse generator assembly for a meter comprising:
   a. a drive means operatively connected to be rotated by the meter,
   b. a driven means journaled in the meter,
   c. spring means connected to the driven means and to be energized responsive to the rotative operation of the drive means,
   d. a lock-and-release means interconnecting the drive means and the driven means selectively to release said driven means upon the spring means being energized a predetermined amount, whereby the spring drives the driven means,
   e. an annular magnet having a plurality of alternately oppositely magnetized poles circumferentially spaced hereon,
   f. a coil assembly disposed in the meter and including a winding having a plurality of pole pieces circumferentially spaced about the magnet adjacent each of the magnetized poles,
   g. a one-way clutch drivingly connecting the driven means and the magnet to permit the magnet to continue rotation after the driven means has stopped to generate within said winding an AC voltage, and
   h. a rectifier electrically connected to the winding to convert the AC voltage to a DC voltage pulse.

2. The combination claimed in claim 1 wherein:
   a. a shaft is stationarily mounted in the meter to fixedly carry the coil assembly, and to journal the magnet, the driven means and the drive means thereon,
   b. the spring means is interconnected between he driven means and the driven means to be wound each revolution,
   c. the lock release means is pivotally mounted in spaced relation to the shaft and has offset arms oppositely extending, with one arm engaging the driven means and the other arm engaging the driven means to prevent rotation thereof,
   d. a cam is formed on the drive means against which the said one arm is biased,
   e. the other arm is pivoted to release the driven means once each revolution, whereby the driven means is spring driven to drive the magnet through the one-way clutch.

3. The combination claimed in claim 2 wherein:
   a. the drive means and the driven means are journaled on the shaft in superposition, one above the other, b. an annular flange is formed on the drive means to extend axially toward the driven means, c. an annular flange is formed on the driven means, in radially spaced relation to the flange on the drive means, and to extend axially toward the drive means, d. the spring has one end connected to the flange of the drive means, and the other end connected to the flange of the driven means, with several spiral windings therebetween.

4. The combination claimed in claim 3 wherein: inwardly
a. the flange on the driven means is formed radially i5wardly of the flange on the drive means, b. each of the flanges of the drive means and the driven means axially overlap each other, c. the cam of the drive means is formed on the outer circumference of the flange of the drive means.

5. The combination claimed in claim 1 wherein:
a. the spring means includes a spiral spring interconnected between the drive means and driven means, b. the spiral spring is wound by the rotation of the drive means, c. the lock-and-release means releases the driven means during each revolution of the drive means after the spiral spring is wound to permit said spring to drive the driven means.

6. The combination claimed in claim 5 wherein:
a. the spiral spring drives the driven means for one revolution as the spiral spring unwinds, b. the lock-and-release means engages the driven means at the end of the revolution to prevent rotation thereof during rewinding of the spiral spring by the drive means.

7. The combination claimed in claim 6 wherein:
a. the driven means is rotated in a single direction of rotation by the successive intermittent action of the spiral spring, b. the magnet is rotated through the one-way clutch in the same direction of rotation as the driven means, c. the magnet continues to rotate for more than one revolution.

8. The combination claimed in claim 7 wherein:
/. the one-way clutch defines a plate affixed to the bottom of the annular magnet, b. the plate has a plurality of circumferentially spaced sprags formed thereon extending in the direction of the driven means, c. annular saw tooth projections are formed on the driven means adjacent to and engaged by said sprags whereby on the driven means rotating the sprags and magnet will partake of like motion, and on the driven means stopping the sprags will slip over said projections and the sprags and magnet will rotate until the magnet has exhausted all of its momentum.

PO-1050
(5/69)

UNITED STATES PATENT OFFICE
CERTIFICATE OF CORRECTION

Patent No. 3,599,022   Dated August 10, 1971

Inventor(s) John D. Adair

It is certified that error appears in the above-identified patent and that said Letters Patent are hereby corrected as shown below:

Column 2, line 10, after "The meter" insert -- 24 is --;

Column 2, line 48 is a duplicate of line 47;

Column 2, line 52, "66" should read -- 70 --;

Column 2, line 53, "eafh" should read -- each --;

Column 6, line 2, "or" should read -- of --;

Column 6, line 7, "r3ctified" should read -- rectified --;

Column 6, line 60, "he driven" should read -- the drive --;

Column 7, line 10, delete word "inwardly" after word -- wherein: --;

Column 7, line 11, "i5wardly" should read -- inwardly --;

Column 8, line 14, "/" should read -- a. --.

Signed and sealed this 6th day of June 1972.

(SEAL)
Attest:

EDWARD M. FLETCHER, JR.
Attesting Officer

ROBERT GOTTSCHALK
Commissioner of Patents